A. E. NEWBERRY.
PISTON RING CLAMP.
APPLICATION FILED MAY 24, 1920.
1,386,944.   Patented Aug. 9, 1921.
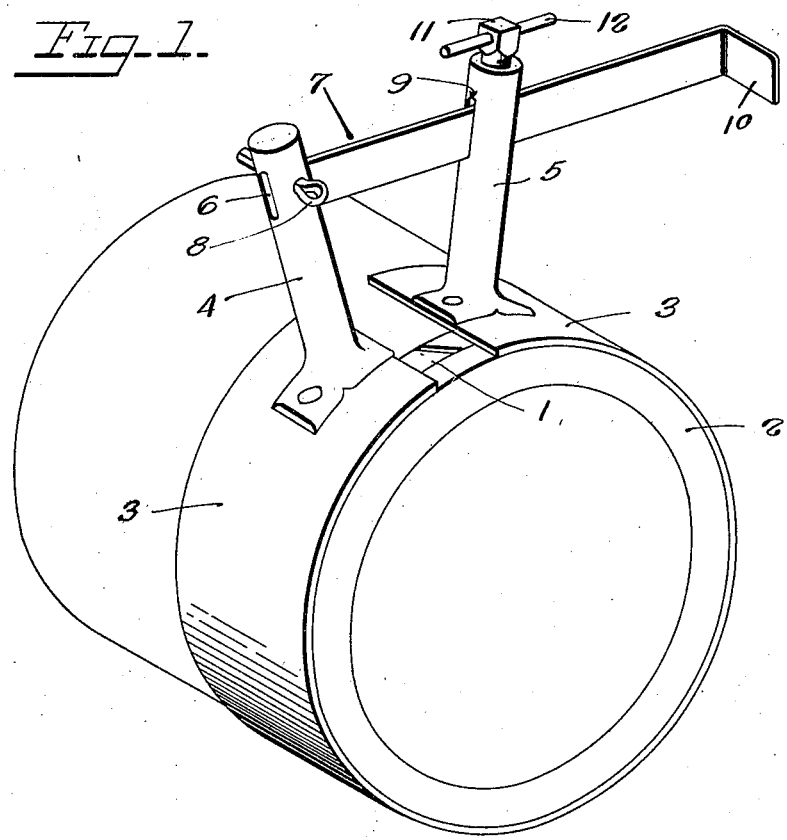
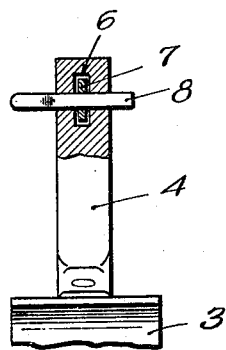
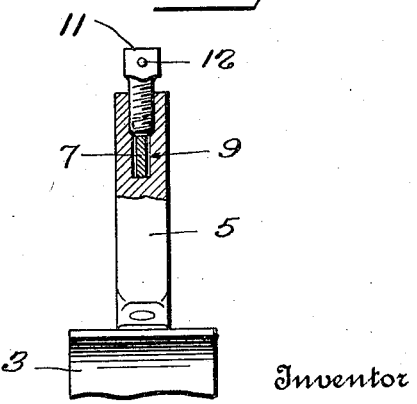
Witness
Elvans D. Haines.
Inventor
Albert E. Newberry.
By H. B. Willson & Co.
Attorneys

UNITED STATES PATENT OFFICE.

ALBERT E. NEWBERRY, OF QUINCY, ILLINOIS.

PISTON-RING CLAMP.

1,386,944.   Specification of Letters Patent.   Patented Aug. 9, 1921.

Application filed May 24, 1920. Serial No. 383,882.

*To all whom it may concern:*

Be it known that I, ALBERT E. NEWBERRY, a citizen of the United States, residing at Quincy, in the county of Adams and State of Illinois, have invented certain new and useful Improvements in Piston-Ring Clamps; and I do declare the following to be a full, clear, and exact description of the invention, such as will enable others skilled in the art to which it appertains to make and use the same.

This invention relates to an improved clamp for use in holding piston rings while inserting the pistons in the cylinders of an internal combustion engine and one object of the invention is to so construct the clamp that the handle portions thereof may be secured with the clamp pressed tightly about a piston and thus permit the operator to put a second clamp in place or guide the piston ring of one piston into the cylinder while the piston ring of a second piston is held compressed by its clamp. In piston ring clamps now in use the clamp is provided with handle extensions but these are not provided with clamping means and therefore the operator must retain his hold upon the clamp in order to prevent the clamp from expanding and thus releasing the ring. Therefore it always takes more than one operator to put new rings in pistons and then guide the pistons back into the cylinders and if there are more than two cylinders to the motor it requires one operator to guide the pistons back into the cylinders and a second operator for each pair of cylinders. With this improved construction the clamp may be tightly gripped about the piston and the connecting bar which is pivotally connected with one handle and extends through a slot in the second engaged by the set-screw and the clamp thus securely held in tight engagement with the piston to compress the ring in the piston ring groove. This improved piston ring clamp is illustrated in the accompanying drawings wherein:

Figure 1 is a perspective view showing the clamp applied to a piston.

Fig. 2 is a fragmentary view of the clamping band and one handle with the outer end portion of the handle shown in section.

Fig. 3 is a similar view showing the outer end portion of the second handle in section with the set screw engaging the locking strip.

This device which is used to compress a piston ring 1 so that the ring may be compressed into the annular ring groove of the piston 2 is provided with a band 3 which is formed of resilient material and is of such size that it may fit upon a piston without completely extending about the piston. This band is provided with handle extensions 4 and 5 which are connected with the end portions of the band by rivets or other fasteners. The handle 4 is provided adjacent its outer end with a transversely extending slot 6 in which one end of the locking strip 7 will be positioned and loosely secured therein for limited pivotal movement by means of the cotter pin 8. This cotter pin illustrates one form of the removable pivot for the locking strip and it is to be understood that a small bolt or other similar fastener could be substituted for the cotter pin. The second handle 5 is provided with a slot 9 and the locking strip 7 slidably passes through this slot and has its free end portion 10 bent over to one side thus preventing the strip 7 from passing back through the slot 9. A set-screw 11 which is provided with a turning rod or pin 12 is screwed into a threaded socket formed in the handle 5 and when screwed inwardly will engage the locking strap 7 and thus releasably hold it against longitudinal movement. Therefore when the clamp has been tightly gripped about a piston the set-screw 11 may be tightened and the clamp will be securely held against expanding. Therefore the clamp may be left in place and a second clamp put in place upon a second piston. This will also permit an operator to put the clamps in place upon the pistons and then rotate the crank shaft to draw the pistons into the cylinders. As the pistons move inwardly the clamping bands or collars 3 will engage the upper ends of the cylinders and the pistons will then slip through the clamping collars and will move into the cylinders without the piston rings expanding and preventing the pistons from moving into the cylinders. It will thus be seen that a single operator may change a set of piston rings without the assistance of one or more operators. If the locking strip should break or its free end portion should be bent to such an expansion that it could not be properly straightened for use, the fastener 8 could be removed and a new one easily put in place. It will thus be seen that there has been provided a piston ring clamp so constructed that it may be securely held in operative engagement with a piston and further that there has been provided a clamp, of the character described which is simple in construction, efficient in operation and very cheap to produce.

What is claimed is:

1. A piston ring clamp comprising a piston encircling body, handles extending from the body, a locking strip pivotally connected with the free end portion of one handle and extending through a path formed in the second handle, and means carried by the second handle for engaging the locking strip to releasably retain the clamp in a clamping position about a piston.

2. A piston ring clamp comprising a resilient piston encircling body, handles extending from the body, a locking strip pivotally connected with the free end portion of one handle and extending through a path formed in the second handle and a set-screw fitting into a threaded opening extending into the handle from the outer end and engaging the locking strip to releasably hold the strip against longitudinal movement and retain the clamp in a clamping position about a piston.

In testimony whereof I have hereunto set my hand.

ALBERT E. NEWBERRY.